(12) United States Patent
Sebald et al.

(10) Patent No.: US 8,568,155 B2
(45) Date of Patent: *Oct. 29, 2013

(54) LAMINOUS MULTI-POLYMERIC HIGH AMPERAGE OVER-MOLDED CONNECTOR ASSEMBLY FOR PLUG-IN HYBRID ELECTRIC VEHICLE CHARGING

(75) Inventors: Damien T. Sebald, Crescent Springs, KY (US); Brian D. Smith, Florence, KY (US)

(73) Assignee: General Cable Technologies Corporation, Highland Heights, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/328,150

(22) Filed: Dec. 16, 2011

(65) Prior Publication Data
US 2012/0171900 A1    Jul. 5, 2012

Related U.S. Application Data

(63) Continuation-in-part of application No. 13/211,867, filed on Aug. 17, 2011, which is a continuation-in-part of application No. 29/382,230, filed on Dec. 30, 2010, now Pat. No. Des. 663,692.

(60) Provisional application No. 61/430,456, filed on Jan. 6, 2011, provisional application No. 61/482,459, filed on May 4, 2011.

(51) Int. Cl.
*H01R 13/62* (2006.01)
(52) U.S. Cl.
USPC .......................................... 439/304; 439/310

(58) Field of Classification Search
USPC ............ 439/206, 358, 217, 218, 607.42, 205, 439/304–310, 582, 607.41
See application file for complete search history.

(56) References Cited

U.S. PATENT DOCUMENTS

| 4,810,213 A | 3/1989 | Chabot |
| 4,884,980 A | 12/1989 | Bensing et al. |
| 5,059,143 A | 10/1991 | Grabbe |
| 5,350,312 A | 9/1994 | Kuno et al. |
| D369,782 S | 5/1996 | Hashizawa et al. |

(Continued)

FOREIGN PATENT DOCUMENTS

KR          100647818         11/2006

OTHER PUBLICATIONS

ITT Interconnect Solutions Delivering the Industry's first, UL Rated, J1772 Level 2 "75 AMP" Less than Four Hour Charging Solution (4 pages).

*Primary Examiner* — Renee S Luebke
*Assistant Examiner* — Larisa Tsukerman
(74) *Attorney, Agent, or Firm* — Blank Rome LLP

(57) ABSTRACT

In an electrical connector for an electric vehicle, the spring latch is not sealed; instead, the connector body has holes allowing water entering the spring latch mechanism to drain harmlessly out of the connector. A forward-facing LED or other light source acts as a flashlight. Once the connector is connected, the forward-facing LED is switched off, and a rear-facing LED or other light source is switched on to confirm that the connector is connected and capable of charging the vehicle. The connector is produced by overmolding in a three-layer configuration, where each layer is formed of a material having advantageous materials for that layer's position in the connector.

5 Claims, 18 Drawing Sheets

(56) References Cited

U.S. PATENT DOCUMENTS

| | | | |
|---|---|---|---|
| D369,783 S | 5/1996 | Endo et al. | |
| D370,461 S | 6/1996 | Yoshioka et al. | |
| D370,462 S | 6/1996 | Fukao et al. | |
| D370,659 S | 6/1996 | Endo et al. | |
| 5,536,173 A | 7/1996 | Fujitani et al. | |
| D373,110 S | 8/1996 | Fukao et al. | |
| D375,721 S | 11/1996 | Endo et al. | |
| 5,577,920 A | 11/1996 | Itou et al. | |
| D377,643 S | 1/1997 | Endo et al. | |
| D378,292 S | 3/1997 | Yoshioka et al. | |
| 5,614,808 A | 3/1997 | Konoya et al. | |
| 5,627,448 A | 5/1997 | Okada et al. | |
| D379,967 S | 6/1997 | Hashizawa et al. | |
| 5,639,256 A | 6/1997 | Endo et al. | |
| D390,827 S | 2/1998 | Sekimori et al. | |
| 5,751,135 A | 5/1998 | Fukushima et al. | |
| 5,803,760 A | 9/1998 | Ito et al. | |
| 5,820,395 A | 10/1998 | Hashizawa | |
| 5,873,737 A | 2/1999 | Hashizawa et al. | |
| 5,906,500 A * | 5/1999 | Kakuta et al. | 439/310 |
| 6,123,569 A | 9/2000 | Fukushima et al. | |
| 6,142,829 A * | 11/2000 | O'Groske et al. | 439/620.08 |
| 6,283,790 B1 * | 9/2001 | Idehara et al. | 439/582 |
| 6,371,768 B1 | 4/2002 | Neblett et al. | |
| 6,910,911 B2 | 6/2005 | Mellott et al. | |
| 7,215,044 B2 * | 5/2007 | Mistry et al. | 307/147 |
| 7,404,720 B1 | 7/2008 | Frey et al. | |
| D603,337 S | 11/2009 | Katou et al. | |
| D615,040 S | 5/2010 | Slippy et al. | |
| 7,854,634 B2 * | 12/2010 | Filipon et al. | 439/676 |
| 7,878,866 B1 | 2/2011 | Kwasny et al. | |
| 7,878,886 B2 | 2/2011 | Sun et al. | |
| D636,334 S | 4/2011 | Kato et al. | |
| D641,694 S | 7/2011 | Akahori et al. | |
| 8,016,607 B2 | 9/2011 | Brown, II | |
| D655,242 S | 3/2012 | Holthusen | |
| 2007/0037456 A1 | 2/2007 | Burgess | |
| 2007/0141904 A1 * | 6/2007 | Hayashi | 439/587 |
| 2009/0111324 A1 * | 4/2009 | Hughes et al. | 439/607.02 |
| 2009/0238400 A1 | 9/2009 | Im | |
| 2009/0273310 A1 | 11/2009 | Flack | |
| 2010/0015826 A1 * | 1/2010 | Daily et al. | 439/147 |
| 2010/0197171 A1 | 8/2010 | Matsumoto et al. | |
| 2010/0261361 A1 | 10/2010 | Kasparian et al. | |
| 2011/0145141 A1 | 6/2011 | Blain | |

\* cited by examiner

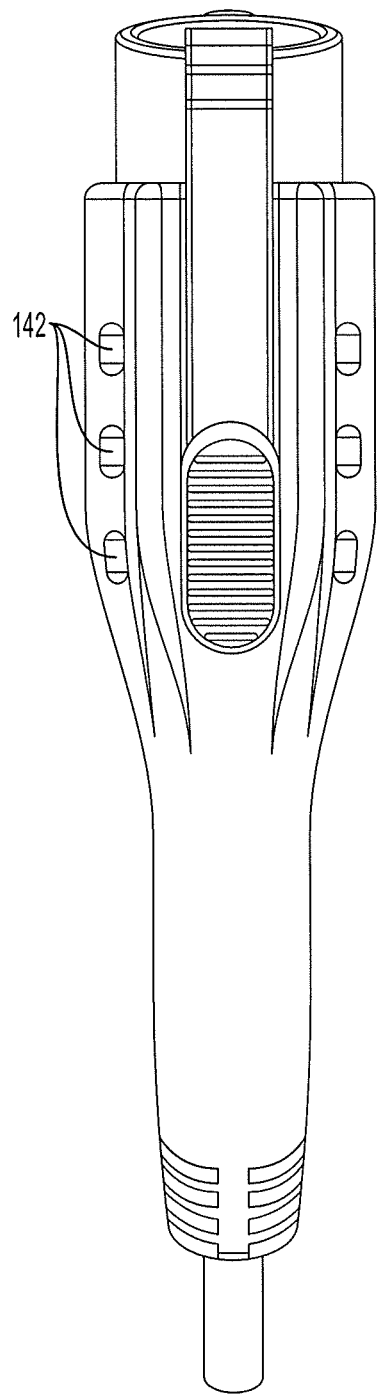
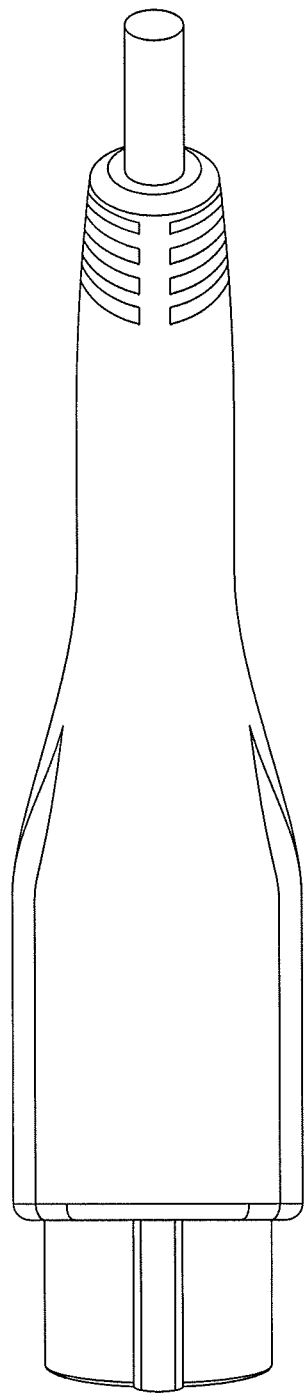
FIG. 2
FIG. 3

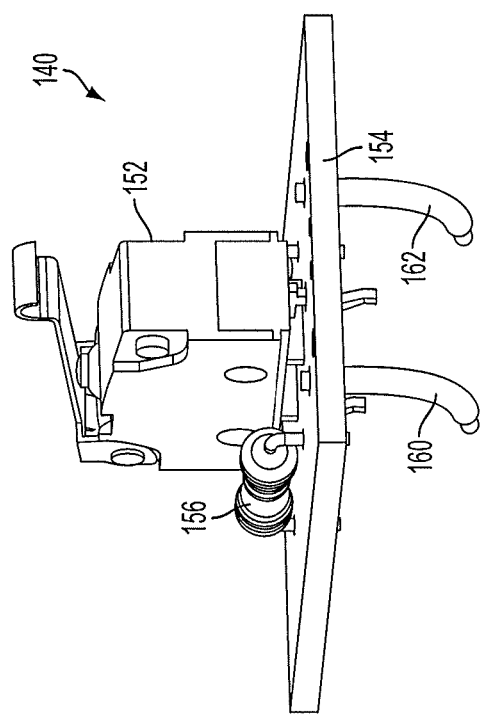
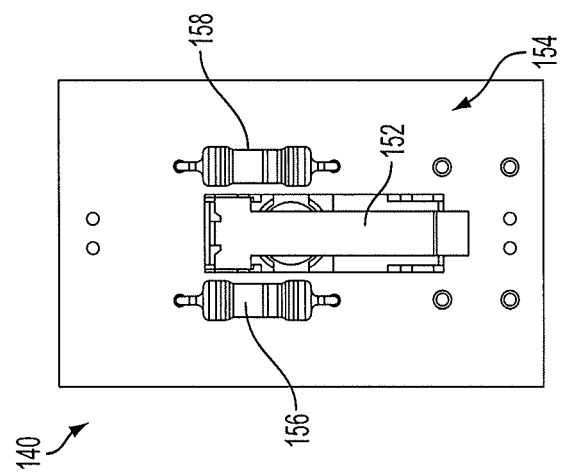

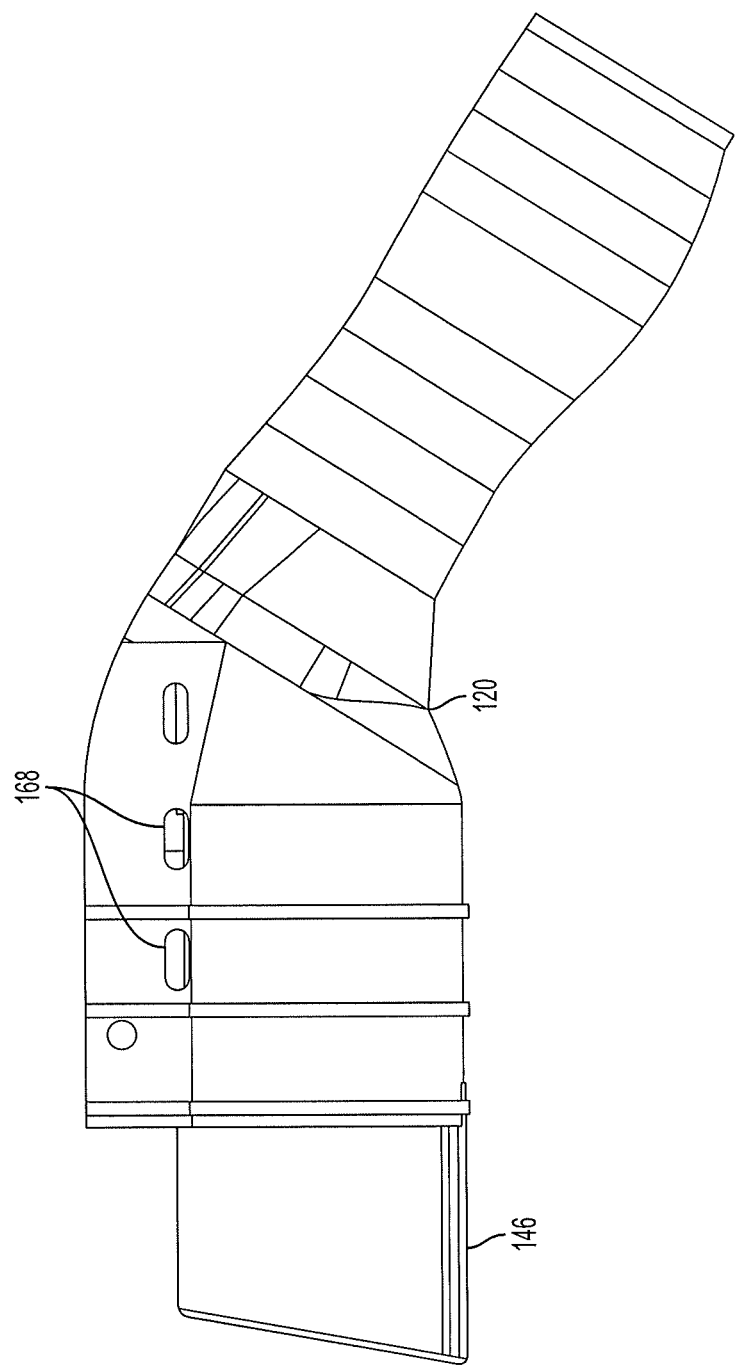

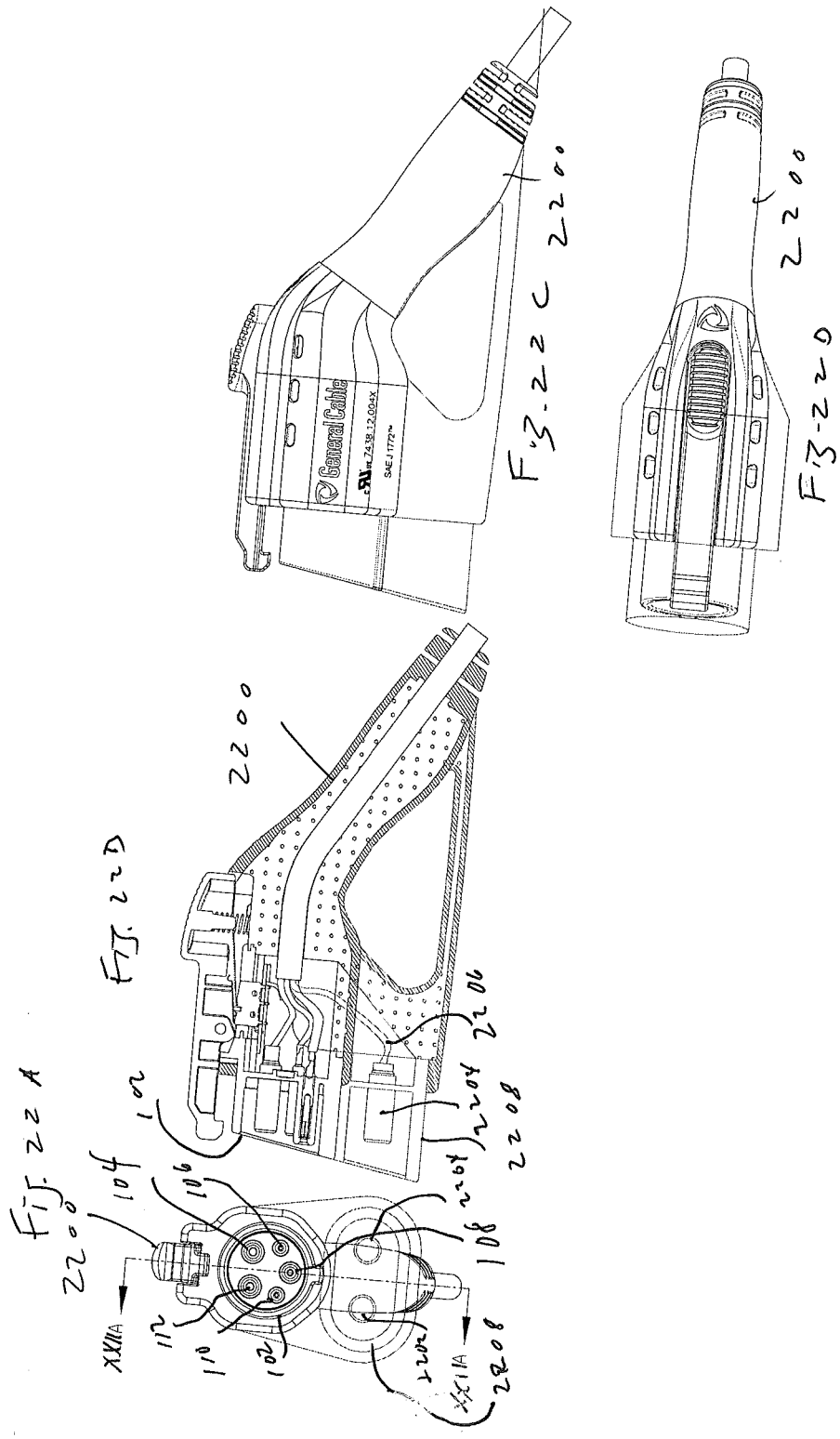

LAMINOUS MULTI-POLYMERIC HIGH AMPERAGE OVER-MOLDED CONNECTOR ASSEMBLY FOR PLUG-IN HYBRID ELECTRIC VEHICLE CHARGING

REFERENCE TO RELATED APPLICATIONS

The present application is a continuation-in-part of U.S. patent application Ser. No. 13/211,867, filed Aug. 17, 2011, currently pending, which claims the benefit of U.S. Provisional Patent Application No. 61/430,456, filed Jan. 6, 2011, and U.S. Provisional Patent Application No. 61/482,459, filed May 4, 2011. The present application is also a continuation-in-part of U.S. Design Pat. No. 29/382,230, filed Dec. 30, 2010, and of U.S. Design Pat. No. 29/408,312, filed Dec. 9, 2011, both of which are currently pending. The disclosures of the above-referenced applications are hereby incorporated by reference in their entireties into the present application.

FIELD OF THE INVENTION

The present invention is directed to an electrical connector for supplying power to an electric vehicle and more particularly to such a connector having improved resistance to water in the environment and improved user-friendliness.

DESCRIPTION OF RELATED ART

Electric vehicles are increasingly receiving attention. These include plug-in hybrid vehicles such as the Chevrolet Volt and purely electric vehicles such as the Nissan Leaf.

Electrical connectors for recharging the batteries of electric vehicles are standardized in North America by Society of Automotive Engineers (SAE) standard SAE J1772. Other applications, such as forklifts and industrial equipment, may also adopt that standard.

According to that standard, the front of the connector has a standardized shape and five pins in a standardized layout, so that all connectors work with all electric vehicles. The five pins are two AC power pins, a ground pin, a proximity detection pin and a control pilot pin. Regarding the rest of the connector, the manufacturer of each connector has some discretion. Known connectors typically use spring latches to secure the connector to the vehicle during charging.

Since such connectors are typically used outdoors, environmental considerations, such as water, must be taken into account. For example, water may get into the mechanism of the spring latch and cause corrosion or other degradation. The usual way to prevent such degradation is to use a rubber seal to protect the spring latch. However, seals fail.

There are also the problems of using the connector at night, when the motorist may not be able to see properly, and of letting the motorist know when the connector has been fully and properly inserted.

Moreover, known connectors are typically manufactured from multiple parts. As a consequence, they can be expensive to manufacture and prone to failure.

To date, all solutions currently available in the Electric Vehicle (EV) market space are constructed from two halves (or clamshells) which are mechanically assembled with tamper-resistant fasteners such as Torx™ screws. The old or current SAE J1772 mechanically assembled connectors currently allow water to enter the handle assembly, leading to an opportunity for ice and debris to become trapped. Additionally, the clamshells add a bulky appearance at the handle and overall body, which is driven by the additional mechanical features required to resist vehicle roll-over and crush requirements, as stated in UL 2251. These current devices are suitable for garage and indoor applications. When used outdoors, these clam-shell designs may exhibit shorter life cycles due to exposure to the elements.

SUMMARY OF THE INVENTION

It is therefore an object of the invention to address the above concerns.

It is another object of the invention to provide a low-cost, attractive, ergonomic and adaptable solution.

To achieve the above and other objects, the present invention is directed to a connector having at least one of the following features.

The spring latch is not sealed; instead, the connector body has holes allowing water entering the spring latch mechanism to drain harmlessly out of the connector. A forward-facing LED or other light source acts as a flashlight. Once the connector is connected, the forward-facing LED is switched off, and a rear-facing LED or other light source is switched on to confirm that the connector is connected and capable of charging the vehicle.

The connector is produced by overmolding. For example, the connector can be produced in a three-layer configuration, with potting material, a premold, and a one-piece overmold. Each of the layers can be formed of a different material that gives it the properties needed for its location in the connector. The modular design allows for faster product updates and a common platform for product diversification.

The above features can be combined in any way.

The problem being solved by this invention is offering the EV (electric vehicle) market space (such as Original Equipment Manufacturers (OEM) and Electric Vehicle Supply Equipment (EVSE) manufacturers) a ruggedized and integrated overmolded SAE J1772 connector and cable assembly solution that offers reduced life-cycle costs and improved product reliability, and that also reduces the risks of tampering and vandalism associated with mechanical locking features and hardware (such as Torx™ Screws). This overmolded solution offers exceptional environmental protection from the extreme environmental elements which may include: water, ice, dust, ultra-violet rays, oils and automotive fluids.

BRIEF DESCRIPTION OF THE DRAWINGS

FIG. 2 is a top view of the connector of FIG. 1;

FIG. 3 is a bottom view of the connector of FIG. 1;

FIG. 12A is a top view of a micro-switch assembly used in the connector of FIG. 1;

FIG. 12B is a perspective view of the micro-switch assembly of FIG. 12A;

FIG. 17 is a side view showing a premold molded into place as a step in the assembly of the connector of FIG. 1;

FIG. 22A is a front view showing a connector according to a variation of the preferred embodiment;

FIG. 22B is a cross-sectional view showing the connector of FIG. 22A;

FIG. 22C is a side view showing the connector of FIG. 22A; and

FIG. 22D is a top view showing the connector of FIG. 22A.

DETAILED DESCRIPTION OF THE PREFERRED EMBODIMENT

Figure 1:
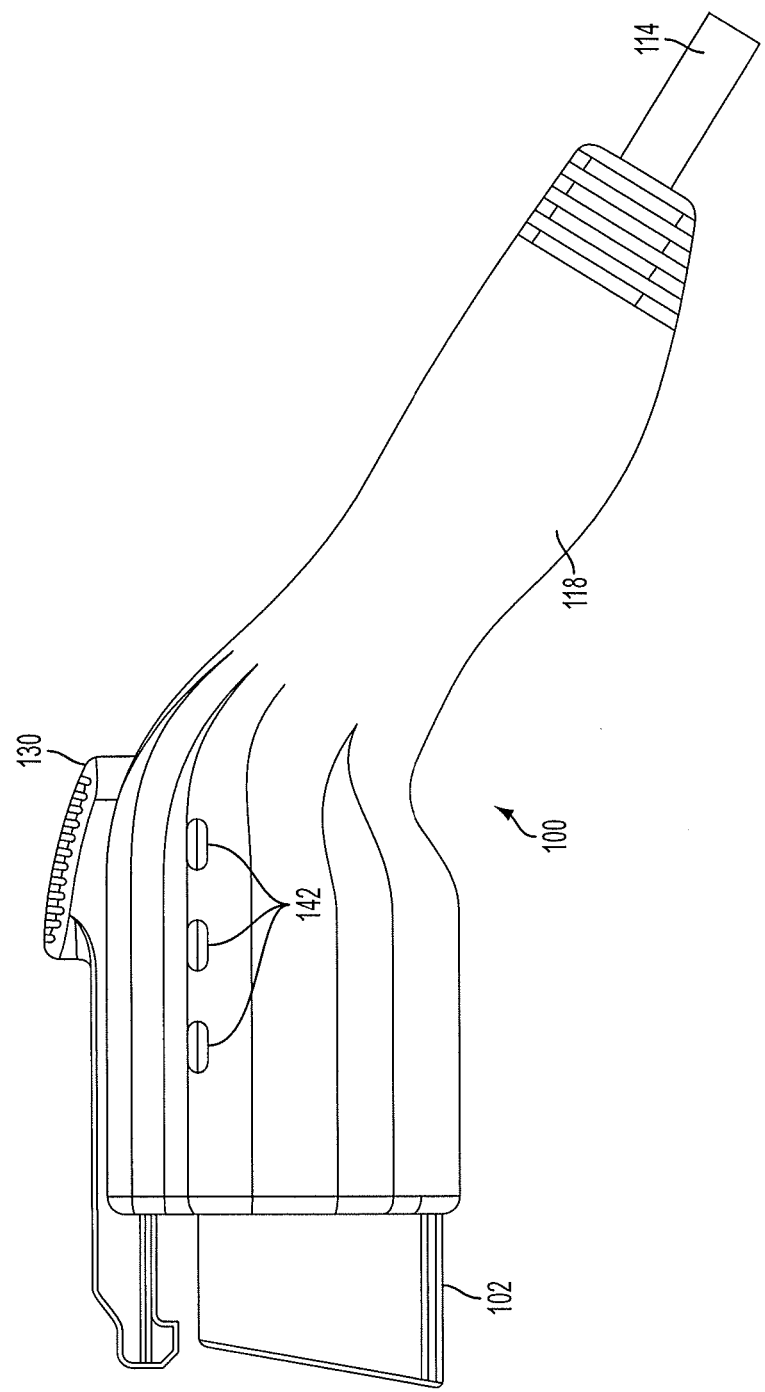
FIG. 1 is a side view of a connector according to the preferred embodiment.
Figure 4:
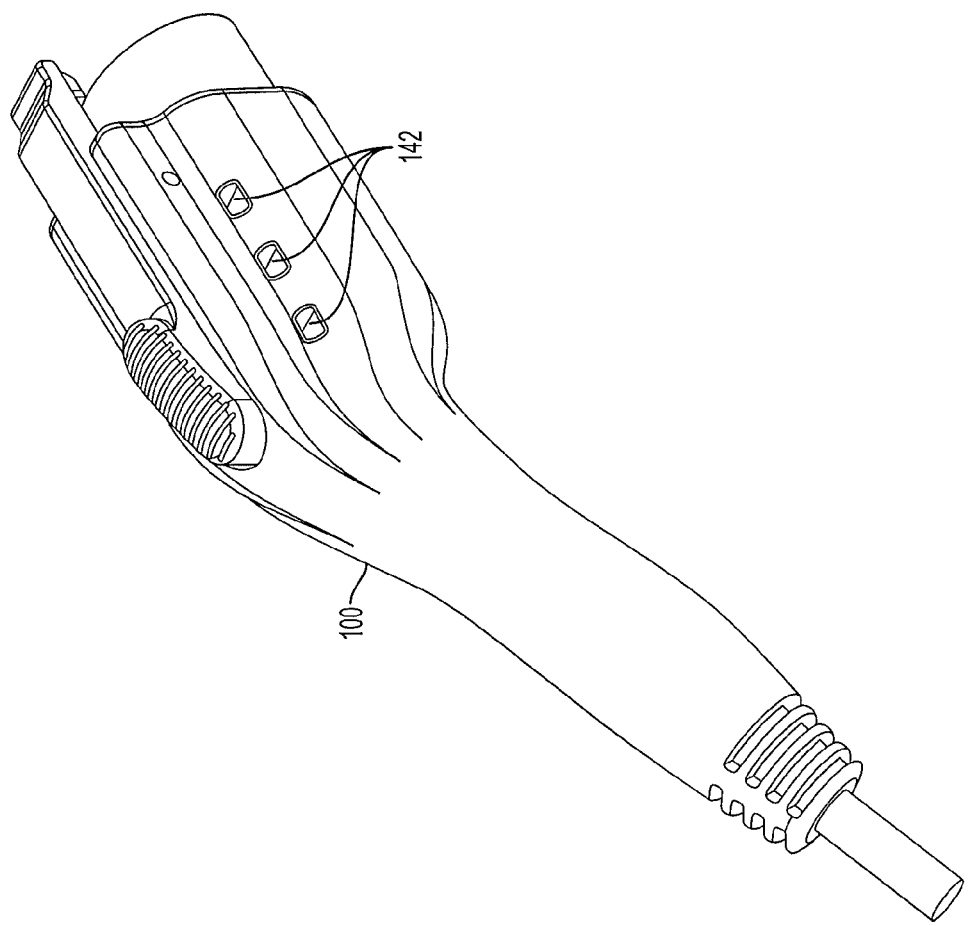
FIG. 4 is a right rear perspective view of the connector of FIG. 1.
Figure 5:
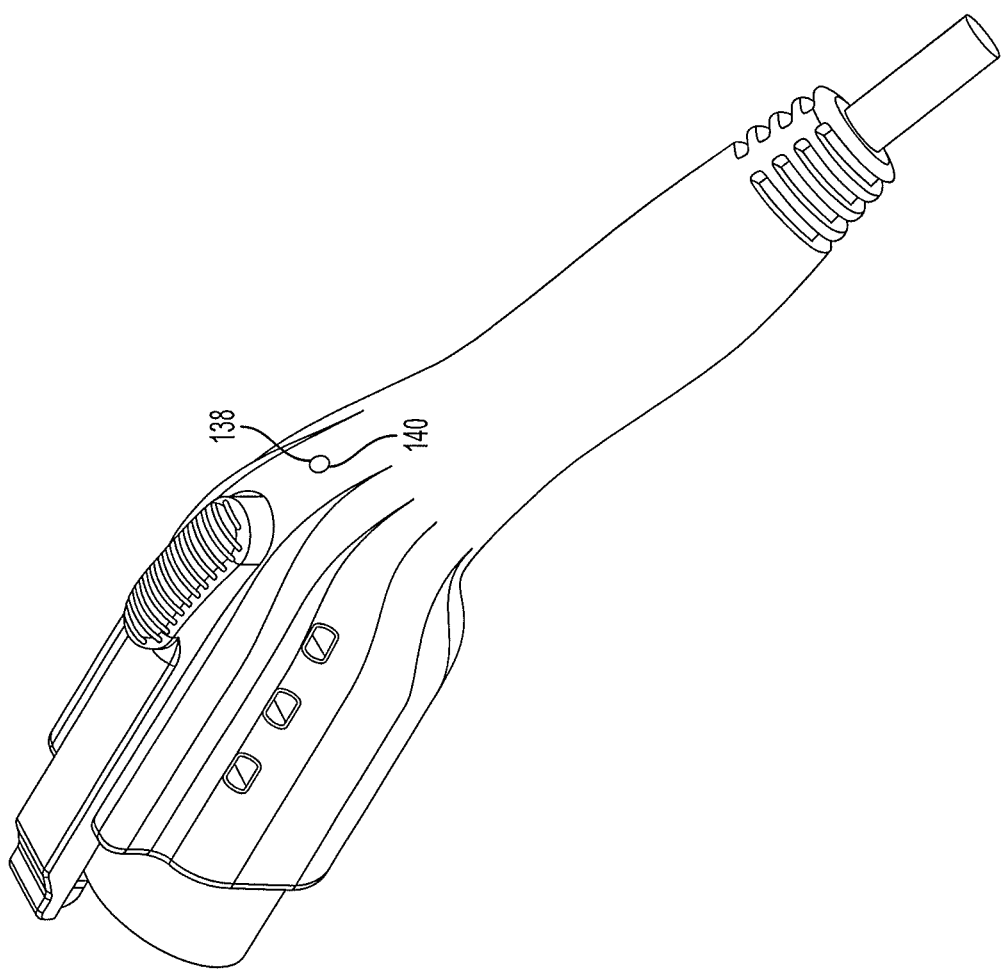
FIG. 5 is a left rear perspective view of the connector of FIG. 1.
Figure 7:
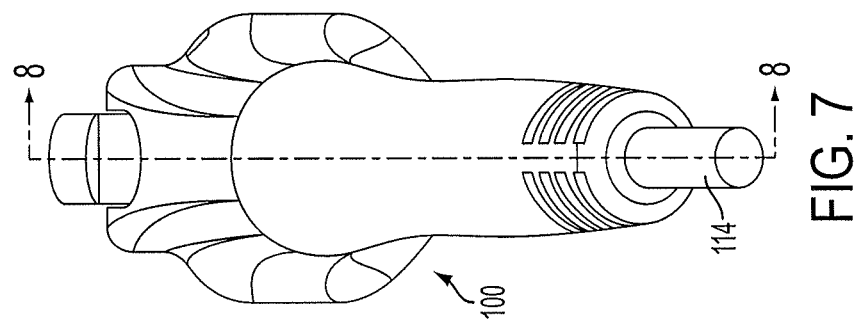
FIG. 7 is a rear view of the connector of FIG. 1.
Figure 6:
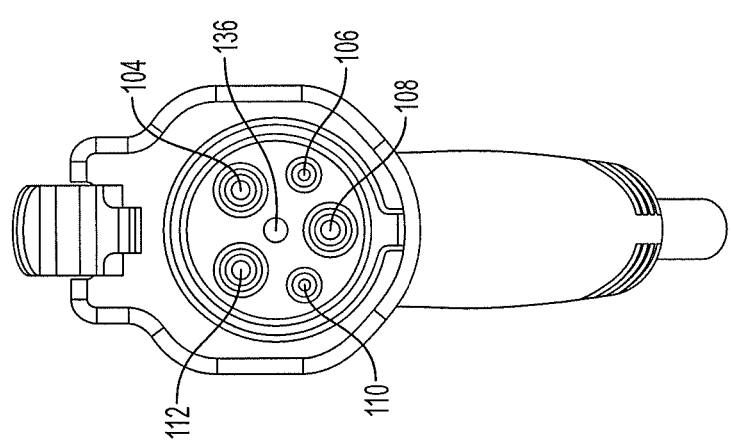
FIG. 6 is a front view of the connector of FIG. 1.
Figure 8:
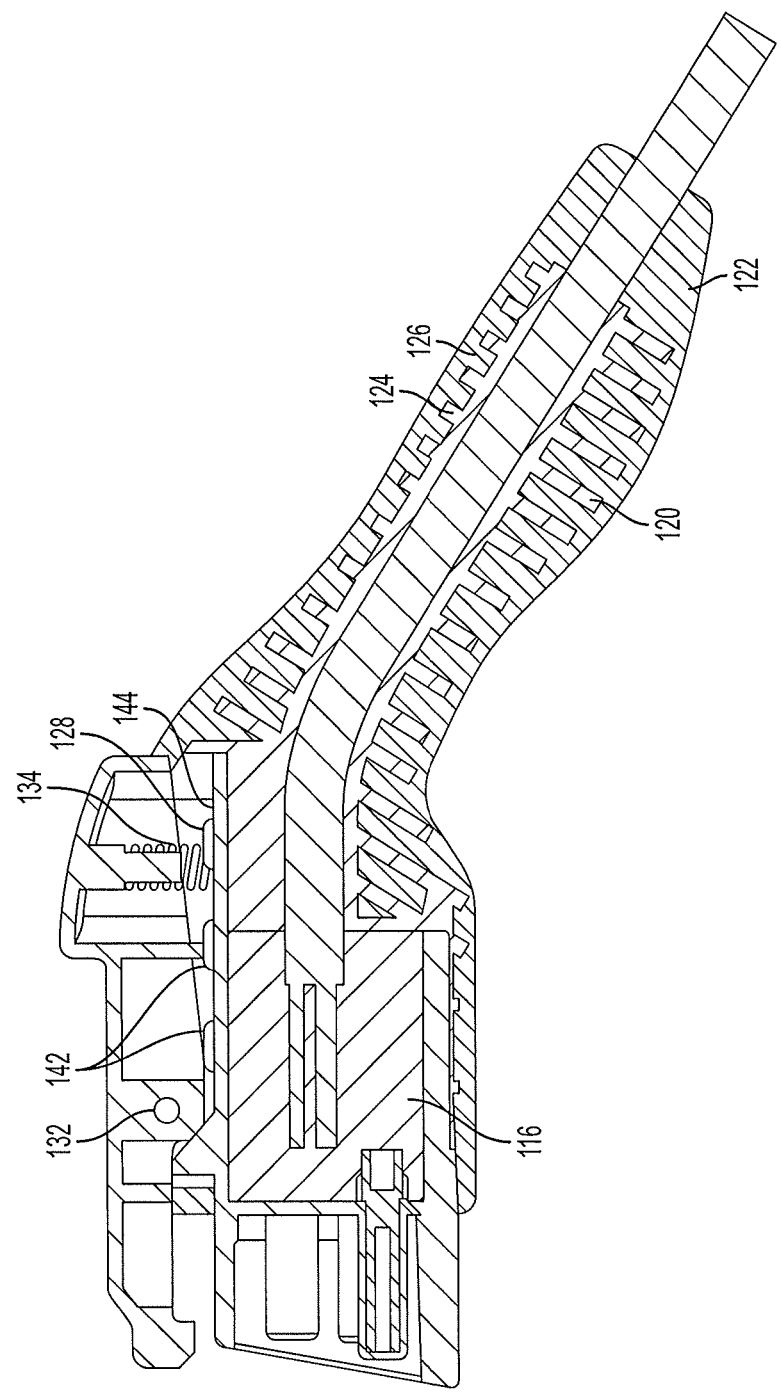
FIG. 8 is a cross-sectional view of the connector of FIG. 1.

A preferred embodiment will be set forth in detail with reference to the drawings, in which like reference numerals refer to like elements throughout.

As shown in FIGS. 1-8, the connector 100 according to the preferred embodiment includes a connector front piece 102 with a plurality of pins 104, 106, 108, 110, 112. In the preferred embodiment, the connector front piece 102 and the pins 104-112 follow the standard SAE J1772. The pins 104-112 are electrically connected to a cable 114 at a location which is sealed inside of the connector front piece 102 with potting 116. A connector body 118 is formed over the connector front piece 102 and the cable 114 by a premold 120 and an overmold 122. The premold 120 and the overmold 122 are formed with ridges 124, 126 to increase the strength of the connector body 118. The connector body has a latch area 128 with a spring latch 130 having a pin 132 and a spring 134.

A first LED or other light 136 can be provided to act as a flashlight, so that the user can use the connector at night in situations of poor lighting. A second LED or other light 138 can be provided on the back to indicate when the proper electrical connection between the connector and the vehicle is achieved, at which time the first LED is switched off. Circuitry 140, such as a printed circuit (PC) board to be described below, is provided for controlling the LED's.

The latch area 128 does not have to be sealed against water. Instead, water entering the latch area 128 exits through holes 142. As shown, there are three holes 142 on either side of the latch area 128, extending through the overmold 122 and into the latch area 128. The holes 142 are open to the latch area 128 at a bottom surface 144 of the latch area 128 so that there will be no places for the water to accumulate. However, any suitable number and configuration of holes can be used instead of, or in addition to, the holes shown.

For example, in use in a rainy situation, rain water incident on the connector 100 enters the latch area 128 by flowing around the spring latch 130. Instead of accumulating in the latch area 128, the water exits the latch area 128 through the holes 142. As noted above, the holes 142 are positioned relative to the bottom surface 144 of the latch area 128 so that all of the water drains out of the latch area 128 rather than forming puddles below the holes 142.

The holes 142 are shown as extending horizontally to facilitate overmolding. The left and right components of the mold used in the overmolding can have projections corresponding to the holes 142 and thus form the holes 142. After the overmolding process, the left and right components are pulled off in a horizontal direction to pull the projections out of the holes 142 thus formed. However, the configuration of the holes 142 can be varied in accordance with various manufacturing techniques. For example, in different manufacturing techniques, the holes 142 could slope downwardly from the latch area 128 or even extend vertically downwardly from the latch area 128. Moreover, holes 142 can be formed in any other suitable manner, e.g., by drilling.

Still other configurations are possible. For example, the latch area 128 could have a bottom surface 144 that is flat or that is crowned to urge water out through the holes 142. Also, while the holes 142 are shown as elongated, they could have any suitable shape, e.g., round.

Figure 9B:
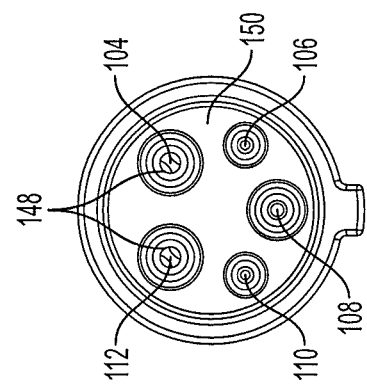
FIG. 9B is a front view of the connector body of FIG. 9A.
Figure 9A:
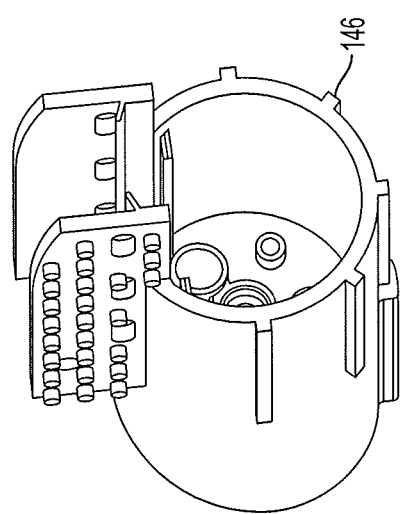
FIG. 9A is a perspective view of an SAE J1772 connector body used in the connector of FIG. 1.

The preferred embodiment provides an overmolded, ruggedized, and robust high-amperage SAE J1772 connector assembly. The production of the preferred embodiment begins with an insert molded SAE J1772 10 amp through 90 amp connector, shown in FIGS. 9A and 9B as 146, made of a polycarbonate material with a UL94 V-0 flame rating with an environmental (f1) ultra-violet rating and a relative thermal index (RTI) equal to or exceeding 100 for electrical and physical impact and strength characteristics, as specified by the standard UL 2251.

The SAE J1772 connector body architecture 146 is that of a rigid body design, which incorporates mechanical features promoting cross-linking adhesion and/or enabling mechanical bonding and mechanical locking features with the premold 120 and the overmold 122. These mechanical features may include flow-through channels, pierced holes, raised joggles or ridgelines.

The connector body contains five 353½ hard brass contacts 104, 106, 108, 110, 112, as described above, which can be silver or gold plated. The two Size 8 power contacts 104, 112 incorporate elliptically wound high amperage and low insertion force internal helical springs 148 to enable higher amperage with reduced opportunities for heating due to micro-arcing, as well as offering additional opportunities of success for reverse compatibility to vehicle inlets (IAW SAE J 1772) manufactured by other manufacturers. These internal helical springs 148 also aid in accommodating the natural tendencies of process shift over time. The springs 148 can be configured as a plurality of toroidal springs, as shown, e.g., in U.S. Pat. No. 4,810,213 to Chabot, whose disclosure is hereby incorporated by reference in its entirety into the present disclosure.

The insert molded SAE J1772 connector body 146 also incorporates a flame retardant (FR) UL listed closed cell gasket 150 on the mating face to aid in the prevention of attack on the contacts from corrosive gases such as carbon dioxide, sulfur dioxide, and hydrogen sulfide.

Figure 11:
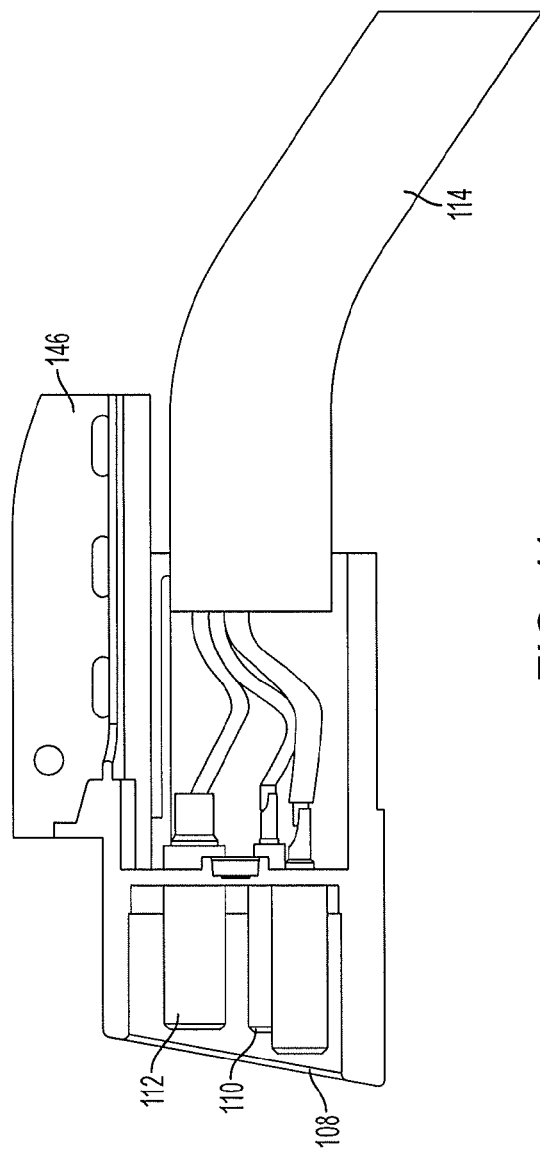
FIG. 11 is a partial cross-sectional view of the connector body of FIGS. 9A and 9B connected to the cable of FIG. 10.
Figure 10:
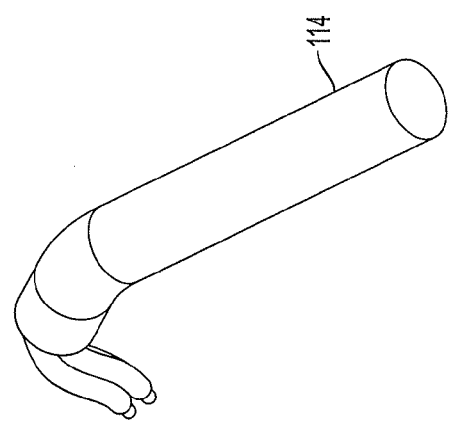
FIG. 10 is a view of a cable used in the connector of FIG. 1.

The connector body 146 is then assembled to an FFSO UL listed cable 114, shown by itself in FIG. 10, by means of a soldering operation to accommodate the pin-out diagram as specified in SAE J1772, as shown in FIG. 11. The soldered contacts of the insert molded SAE J1772 allow for improved cable retention of the overall assembly as well as reduced opportunities for micro-arcing and stray strands, which could lead to risks of shorts and ground faults, reducing the life cycle of the product. Additionally, soldered contacts provide for an additional level of defense to deter the wicking and capillary effect of moisture absorption at the exposed contacts. Water and moisture absorption, or wicking, accelerates copper corrosion and reduces the product life cycle, which may result in higher amperage draw from the branch circuit resulting in excessive heat and customer dissatisfaction.

Figure 13B:
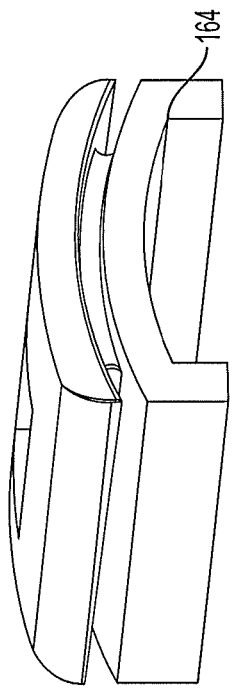
FIG. 13B is a perspective view of the grommet of FIG. 13A.
Figure 13A:
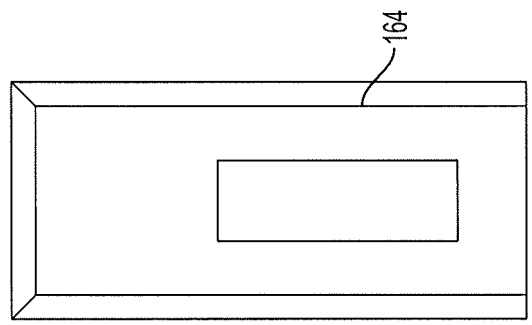
FIG. 13A is a top view of a grommet used in the connector of FIG. 1.
Figure 14:
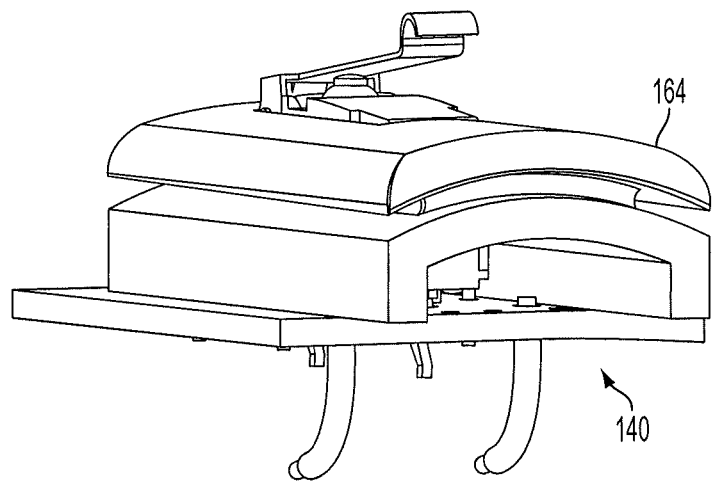
FIG. 14 shows the micro-switch assembly of FIGS. 12A and 12B and the grommet of FIGS. 13A and 13B assembled together.
Figure 15:
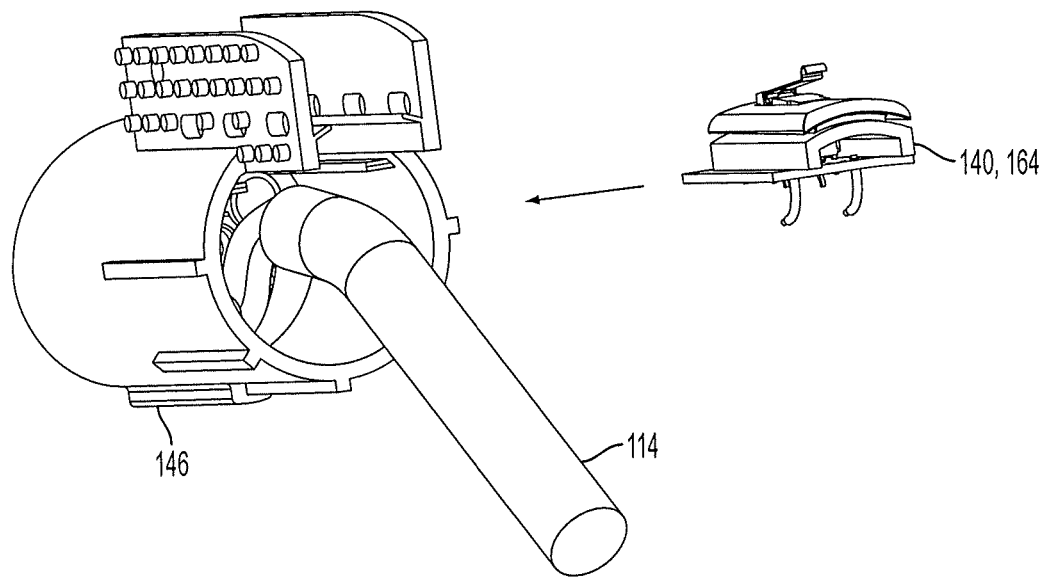
FIG. 15 shows the manner in which the micro-switch assembly of FIGS. 12A and 12B is assembled to the connector body of FIGS. 9A and 9B.

An environmentally sealed micro-switch sub assembly 152 is soldered to an FR-4 PC UL listed PC board 154, which incorporates one 150 Ohm ½ watt resistor 156 and one 300 Ohm ½ watt resistor 158, to implement the circuitry 140 described above as a micro-switch assembly. A grommet, shown in FIGS. 13A and 13B as 164, is then added to the micro-switch sub-assembly 140 and assembled into position, as shown in FIG. 14. The grommet is manufactured from a polymeric molding compound which is UL94 V-1 flame rating with an environmental (f1) ultra-violet rating and a relative thermal index (RTI) equal to or exceeding 90 for electrical and physical impact and strength characteristics, as specified by UL 2251. The assembly 152 and board 154 are attached to the connector body 146, as shown in FIG. 15, by means of soldering the two flying leads (proximity and ground) 160, 162 to the proximity and ground pin contacts 106, 108, enabling the DC pulse signals required by the SAE J1772 Standard. This PC board 154 also provides for the silver path provisions to incorporate LED signals for charge and flashlight requirements that may be activated or required by the EVSE.

Figure 16B:
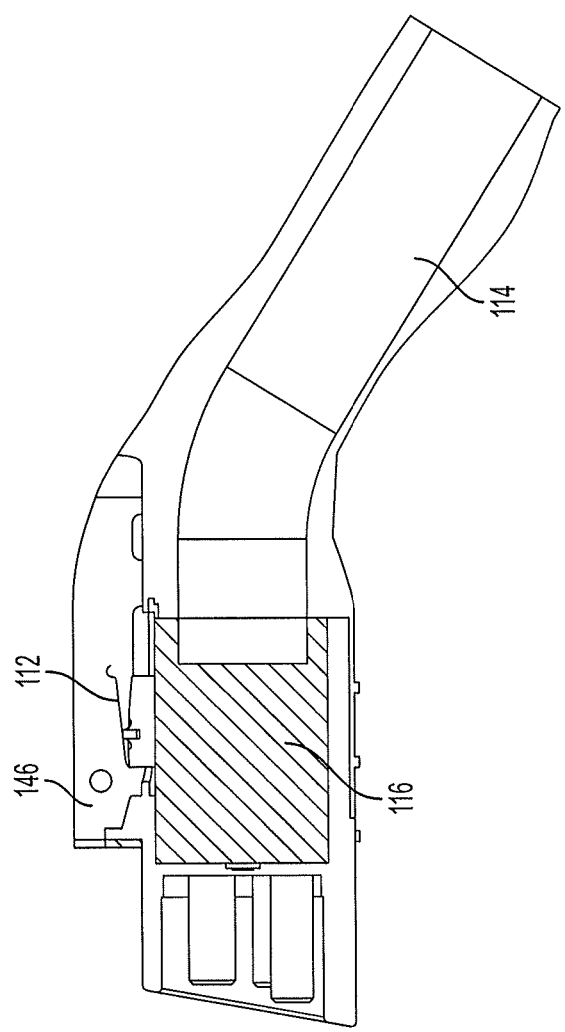
FIG. 16B is a cross-sectional view showing the potting compound in place.
Figure 16A:
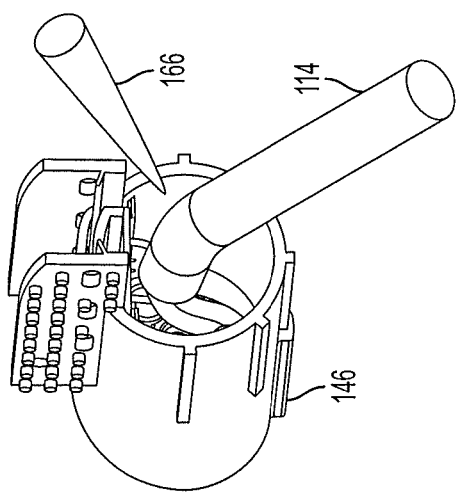
FIG. 16A is a perspective view of a potting process used to assemble the connector of FIG. 1.

When the soldering operation has been completed, the connector body 146, PC board assembly 154, and cable 114 are environmentally and dielectrically potted, as shown in FIGS. 16A and 16B, with a two-part potting compound 166 that has a UL94 HB or V-0 flame rating and a relative thermal index (RTI) equal to or greater than 90 for electrical, physical impact and strength characteristics, as specified by UL 2251, to form the potting 116. This potting compound 166 will then be cured either by overnight stall, or with a heat assist manufacturing aid. The FFSO electric vehicle cable jacket, insulated conductors and soldered connections will be encapsulated with this two part potting compound.

This potting compound 166 provides for the first level of defense to deter the wicking and capillary effect of moisture absorption at the exposed contacts. Copper stranding can, over time, enable a capillary effect in which moisture wicks from the exposed contact area into the copper stranding which accelerates copper corrosion and reduces the product life cycle, which may result in higher amperage draw from the branch circuit resulting in excessive heat and customer dissatisfaction. The potting compound 166 also offers dielectric properties, further insulating the assembly from potential in air arcing between the power contacts and ground. This potting compound 166 is the foundation in which the additional polymeric materials will use for additional structure and support within the design.

After the two-part environmentally and dielectrically potted compound 166 has cured and outgassed completely to form the potting 116, a pre-mold 120 will then be molded over the sub-assembly that includes the connector body 146, the FFSO electric vehicle cable 114, and the potted contact, as shown in FIG. 17. The pre-mold is a high impact Polyamide (PA6 or PA66) based material with a UL94 V-0 flame rating and a relative thermal index (RTI) equal to or greater than 100.

Other specially engineered compounds, such as glass filled polyethylene terephthalate (PET), acrylonitrile butadiene styrene (ABS), thermoplastic elastomer (TPE), thermoplastic vucanizate (TPV), or high impact polypropylene (HIPP), can be used. The pre-mold 120 encapsulates the subassembly, providing for the 'backbone' of the architecture, as well as adding additional environmental and dielectric properties to the overall SAE J1772 molded connector assembly system. The pre-mold 120 includes holes 168 corresponding to the holes 142 of the finished product.

The pre-mold architecture is that of a rigid body design, which incorporates mechanical features promoting either cross-linking adhesion and/or enabling mechanical bonding and mechanical locking features of an outer 'over-mold skin' layer. These mechanical features may include flow-through channels, raised joggles or ridgelines, or depressed valleys and flow-through T-channels.

Figure 18:
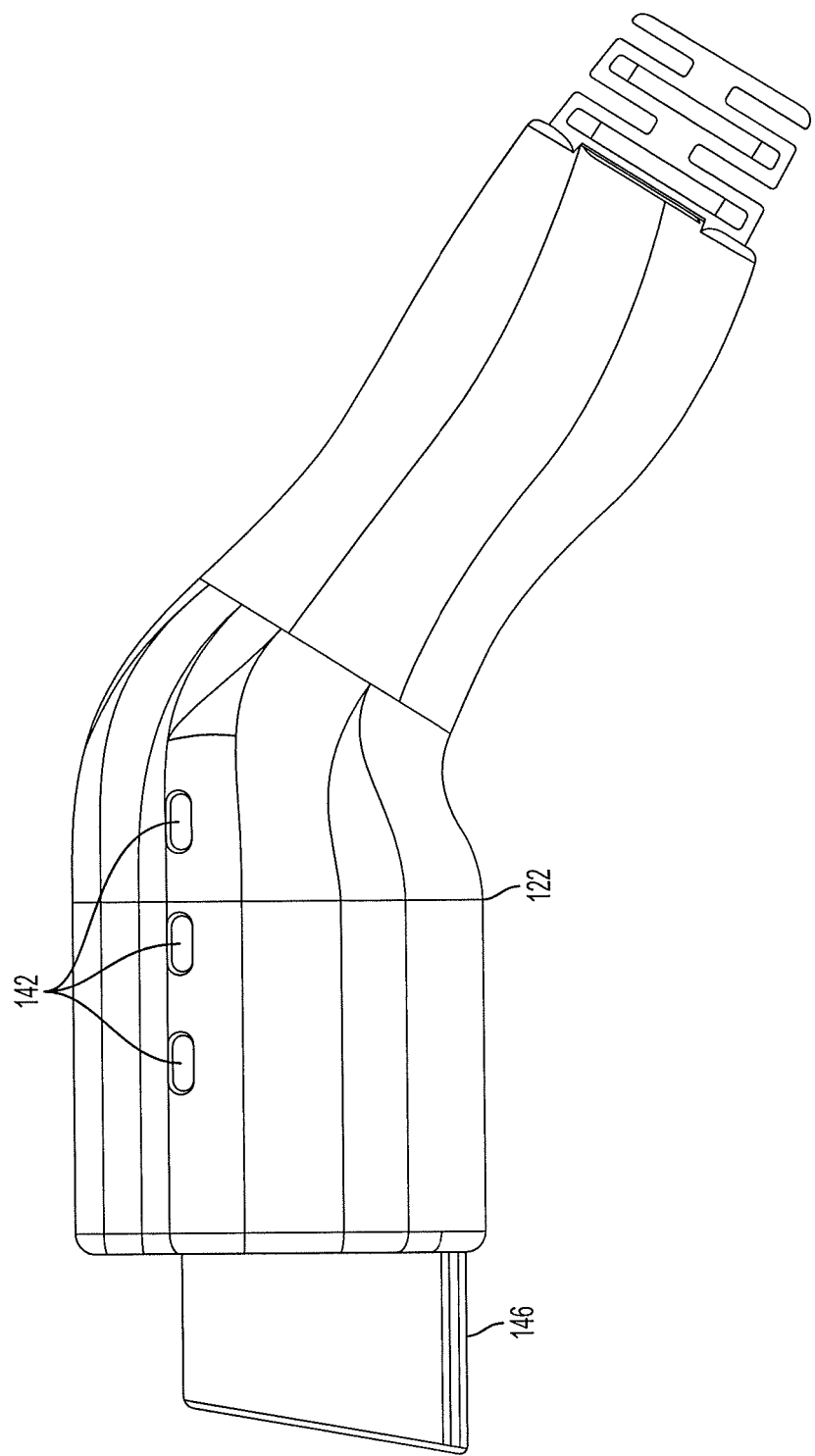
FIG. 18 is a side view of showing an overmold molded into place as a step in the assembly of the connector of FIG. 1.

The over-mold or skin, shown in FIG. 18 as 122, is for user interface, impact energy absorption, abrasion resistance, fluid and gasoline resistance and overall ultra-violet (UV) protection of the overall SAE J1772 molded connector assembly system. The overmold material of the SAE J1772 Connector Assembly has a UL94 HB or V-1 flame rating and a relative thermal index (RTI) equal to or greater than 90 for electrical, physical impact and strength characteristics, as specified by UL 2251. Alternate thermoset materials, such as EPT, EPDM, and silicone or liquid silicone injection, may also be incorporated to accommodate the physical and performance requirements of the outer skin.

Figure 19:
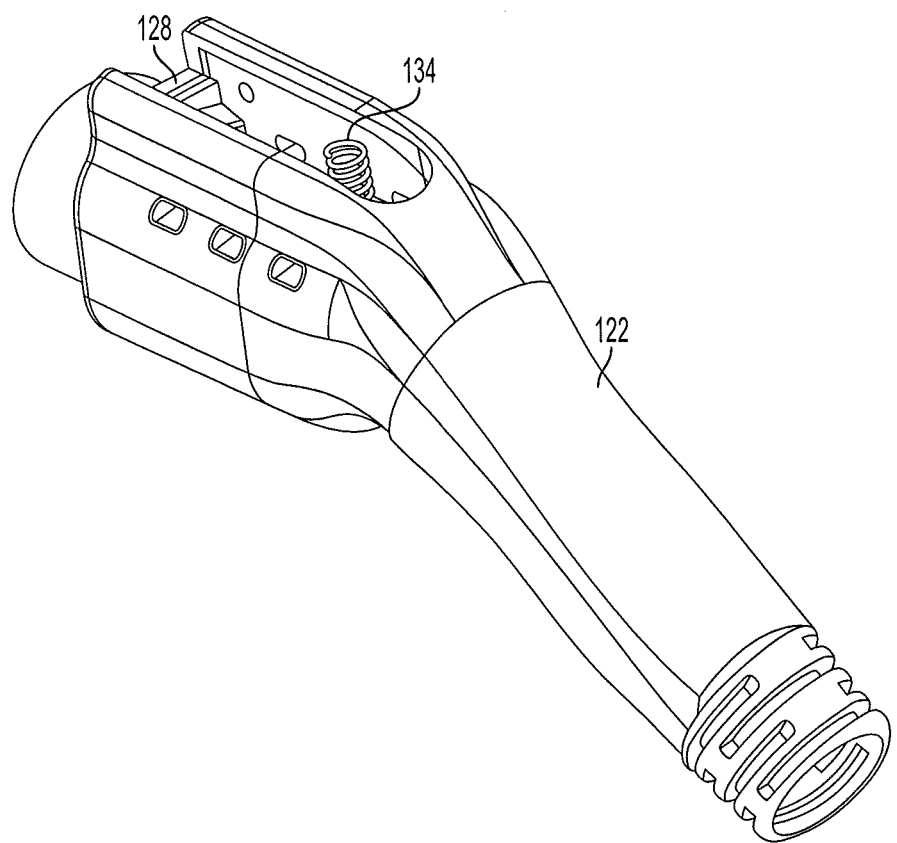
FIG. 19 is a perspective view showing a latch spring assembled into the latch area.
Figure 20:
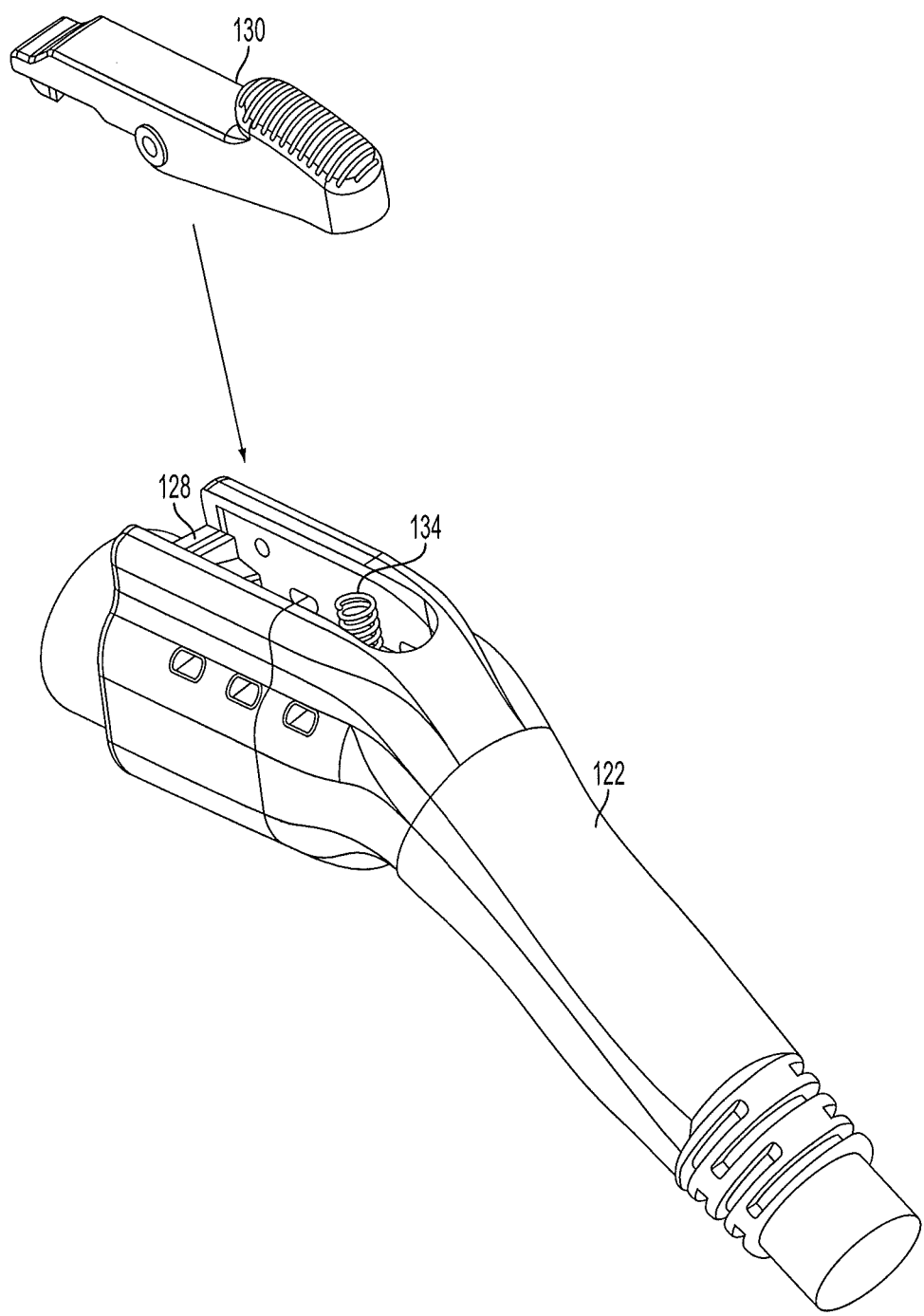
FIG. 20 is a perspective view showing the assembly of a latch arm into the latch area.
Figure 21:
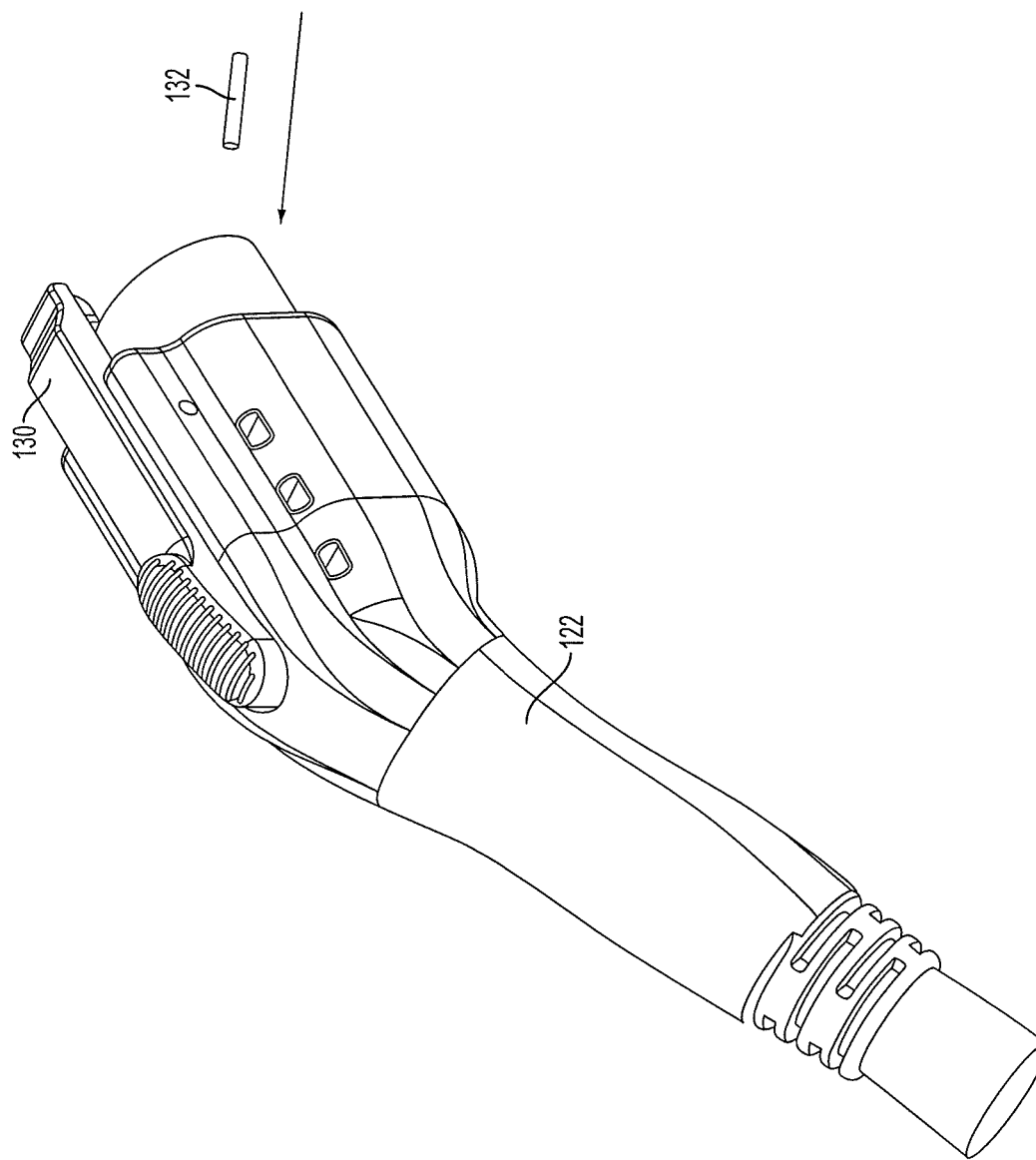
FIG. 21 is a perspective view showing the assembly of a latch pin into the latch area.

Once the system is completely molded, a latch arm 130 manufactured from a polymeric material such as polycarbonate (PC) with a UL94 V-0 flame rating, an environmental (f1) ultra-violet rating and a relative thermal index (RTI) equal to or exceeding 100 for electrical and physical impact and strength characteristics, as specified by UL 2251, is attached. This latch arm is attached by means of a molded or stainless steel (300 Series) pin. The latch provides for the mechanical interlock to the SAE J1772 vehicle inlet as well as the mechanical lever activating the micro-switch sub-assembly prior to commencing charging as well as upon completion of charging. The steps of attaching the latch arm include inserting the latch spring 134 into the latch area 128, as shown in FIG. 19; inserting the latch arm 130 over the spring 134 into the latch area 128, as shown in FIG. 20; and inserting the latch pin 132, as shown in FIG. 21.

Additionally, the market currently only offers 30 AMP and 75 AMP listed assemblies, which are mostly governed by the cable and contact size. The technologies implemented in the preferred embodiment allow a higher current rated (higher amperage) cable assembly to future proof the design for any DC fast charge requirements.

The preferred embodiment provides a ruggedized and robust SAE J1772 overmolded connector assembly incorporating dielectric and environmental potting compounds, with an integrated polymeric substrate and overmolded polymeric skin offering protection from extreme and harsh environmental conditions. The preferred embodiment combines an overmolded integrated polymeric (laminated) approach and an integrated PC board with micro-switch and provisions for LED lights for a charge indicator and a flashlight. The solution offers reduced life-cycle costs, improved product reliability, and a reduced risk of tampering and vandalism associated with mechanical locking features and hardware (such as Torx™ screws). This over-molded solution offers exceptional environmental protection from the extreme environmental elements which may include: water, ice, dust, ultra-violet rays, oils and automotive fluids.

The preferred embodiment, or any other embodiment, can be modified to accommodate both AC charging and rapid DC charging and to allow the user to select which charging mode will be used. FIG. 22A shows a head-on view of a connector 2200 thus modified. FIG. 22B shows a cross-sectional view of the connector, taken along lines XXIIA-XXIIA in FIG. 22A. FIGS. 22C and 22D show side and top views, respectively. The connector 2200 is constructed and used like the connector 100 previously disclosed, except that in addition to the connector front piece 102 and pins 104-112, the connector 2200 also has two additional pins 2202, 2204 connected to leads 2206 and enclosed in a second connector front piece 2208. Any suitable switch can be provided to allow the user to select between AC charging and rapid DC charging.

While a preferred embodiment has been set forth above, those skilled in the art who have reviewed the present disclosure will readily appreciate that other embodiments can be realized within the scope of the invention. For example, any suitable latching mechanism can be used, as can any suitable materials. Also, the connector can be adapted to any standard or proprietary layout. Therefore, the present invention should be construed as limited only by the appended claims.

We claim:

1. An electrical connector for an electric vehicle, the electrical connector comprising:
    a connector body having a latch area formed therein;
    a plurality of connector pins in the connector body, wherein the plurality of connector pins comprise a first set of connector pins for a first charging mode and a second set of connector pins for a second charging mode; and
    a latch mounted in the latch area on the connector body for latching the electrical connector to the electric vehicle;
    wherein the connector body has a plurality of holes extending from the latch area to a surface of the connector body separate from the latch area for allowing water entering the latch area to exit the latch area.

2. The electrical connector of claim 1, wherein the first charging mode is an AC charging mode, and wherein the second charging mode is a DC charging mode.

3. The electrical connector of claim 1, wherein the latch area is defined by a depression formed in the latch body.

4. A method for making an electrical connector for an electric vehicle, the method comprising:
    (a) providing a charging cable and a connector body having a first set of connector pins for a first charging mode and a second set of connector pins for a second charging mode;
    (b) providing electrical connections between the charging cable and the first and second sets of connector pins;
    (c) applying a potting compound over the electrical connections and portions of the connector body and of the charging cable adjacent to the electrical connections to provide a water-impermeable barrier between the electrical connections and components of the electrical connector that may become exposed to water;
    (d) applying a premold over the potting compound, the connector body, and the portion of the charging cable adjacent to the connector body; and
    (e) overmolding an outer connector body in a single piece over the premold to form the connector.

5. The method of claim 4, wherein the first charging mode is an AC charging mode, and wherein the second charging mode is a DC charging mode.

* * * * *